(12) United States Patent
Rasras (10) Patent No.: US 8,559,769 B2
(45) Date of Patent: Oct. 15, 2013

(54) ALL-OPTICAL PHASE SHIFTER IN SILICON

(75) Inventor: Mahmoud Rasras, Berkeley Heights, NJ (US)

(73) Assignee: Alcatel Lucent, Paris (FR)

( * ) Notice: Subject to any disclaimer, the term of this patent is extended or adjusted under 35 U.S.C. 154(b) by 435 days.

(21) Appl. No.: 13/014,864

(22) Filed: Jan. 27, 2011

(65) Prior Publication Data

US 2012/0195547 A1  Aug. 2, 2012

(51) Int. Cl.
*G02F 1/035* (2006.01)

(52) U.S. Cl.
USPC .................. 385/3; 385/9; 385/14; 385/30

(58) Field of Classification Search
USPC ........................................................ 385/3, 14
See application file for complete search history.

(56) References Cited

U.S. PATENT DOCUMENTS

| 5,535,001 A * | 7/1996 | Tajima .......................... 356/477 |
| 2009/0324163 A1 * | 12/2009 | Dougherty et al. ............. 385/14 |

* cited by examiner

*Primary Examiner* — Hemang Sanghavi
(74) *Attorney, Agent, or Firm* — Hitt Gaines, PC (57) ABSTRACT

A device includes a semiconductor waveguide and a control signal waveguide formed along a planar surface of a substrate. The control signal waveguide includes a segment located along and proximate a segment of the semiconductor waveguide. The control signal waveguide is configured to photo-excite charge carriers in said semiconductor waveguide.

20 Claims, 11 Drawing Sheets

ALL-OPTICAL PHASE SHIFTER IN SILICON

TECHNICAL FIELD

This application is directed to an optical devices and systems, and methods of forming such devices and systems.

BACKGROUND

Silicon photonics holds the promise of reducing the size and cost of photonic devices and realizing large-scale photonic integrated circuits for telecom, datacom, and microwave-photonics mixed signal applications. This technology is a promising platform for fast and reconfigurable integrated photonic circuits. High-speed phase-shifters are a key enabler for this technology.

SUMMARY

One aspect provides a device that includes a semiconductor waveguide and a control signal waveguide. The semiconductor waveguide is located along a planar surface of a substrate. The control signal waveguide includes a segment located along and proximate a segment of the semiconductor waveguide. The control signal waveguide is configured to photo-excite charge carriers in the semiconductor waveguide.

Another aspect provides a system. The system includes an electrical control region along a surface of a substrate. The electrical control region includes at least one electrical device that is configured to produce an optical control signal. A second region of the substrate is laterally separated from the electrical control region and includes at least one all-optical device being configured to receive the optical control signal. The all-optical device includes a semiconductor waveguide and a control signal waveguide. The semiconductor waveguide is located along the surface of the substrate. The control signal waveguide has a segment located along and proximate to a segment of the semiconductor waveguide. The control signal waveguide is configured to photo-excite charge carriers within the semiconductor waveguide.

Another aspect provides a method. The method includes providing a semiconductor waveguide along a surface of a substrate. The semiconductor waveguide is formed from a semiconductor material having a bandgap energy. The method further includes forming a control signal waveguide located along and proximate to a segment of the semiconductor waveguide. The control signal waveguide is optically coupled to an optical source that is capable of producing an optical control signal at a wavelength that has an associated energy greater than the bandgap energy of the semiconductor material.

BRIEF DESCRIPTION

Reference is now made to the following descriptions taken in conjunction with the accompanying drawings, in which.

DETAILED DESCRIPTION

An optical phase shifter may modulate the phase of an optical signal propagating within an optical waveguide by changing the refractive index (RI) of the guiding region (e.g. the core) of the waveguide. When the guiding region includes a semiconductor material, the RI of the guiding region may depend on the concentration of majority charge carriers within the semiconductor material.

In some conventional phase shifters, electron-hole pairs may be electrically injected into a semiconductor waveguide via a PIN junction oriented parallel to the propagation axis of the waveguide. An electrical modulation signal is typically routed to the PIN junction by an RF (e.g. greater than about 1 kHz) transmission line. When the phase shifter is a component of a device with a high integration density, routing of the RF line may become difficult. Longer signal interconnect lengths typically cause higher RF loss, and signal lines near the RF transmission line may experience crosstalk. Therefore, the speed of operation and integration density may be limited in devices using such conventional modulators.

Herein, some embodiments benefit from the recognition by the inventor that the aforementioned undesired limitations of conventional modulators may be diminished by modulating the carrier density of a semiconductor waveguide by photo-induction of carriers in the semiconductor. The semiconductor may be illuminated with light having a photon energy greater than the band gap of the semiconductor, thereby generating electron-hole pairs within the semiconductor. The photo-induced carriers may increase the refractive index of the illuminated semiconductor, thereby increasing the optical path length of the illuminated portion. The increased optical path length may produce a phase shift of an optical signal propagating within the semiconductor waveguide. The illumination light may be guided to the illuminated region via an optical interconnect, e.g. a waveguide, thereby avoiding some of the limitations of providing high-speed electrical control signals to the phase shifter.

Figure 1A:
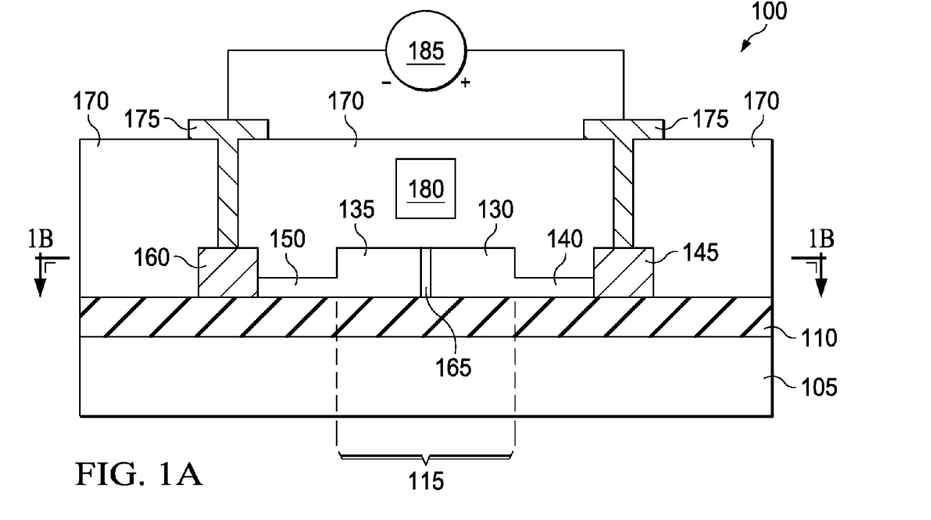
FIGS. 1A-1C illustrate an all-optical phase shifter, with FIG. 1B showing a top view, and FIGS. 1A and 1C respectively showing sectional views transverse and parallel to an optical propagation axis of the device.
Figure 1B:
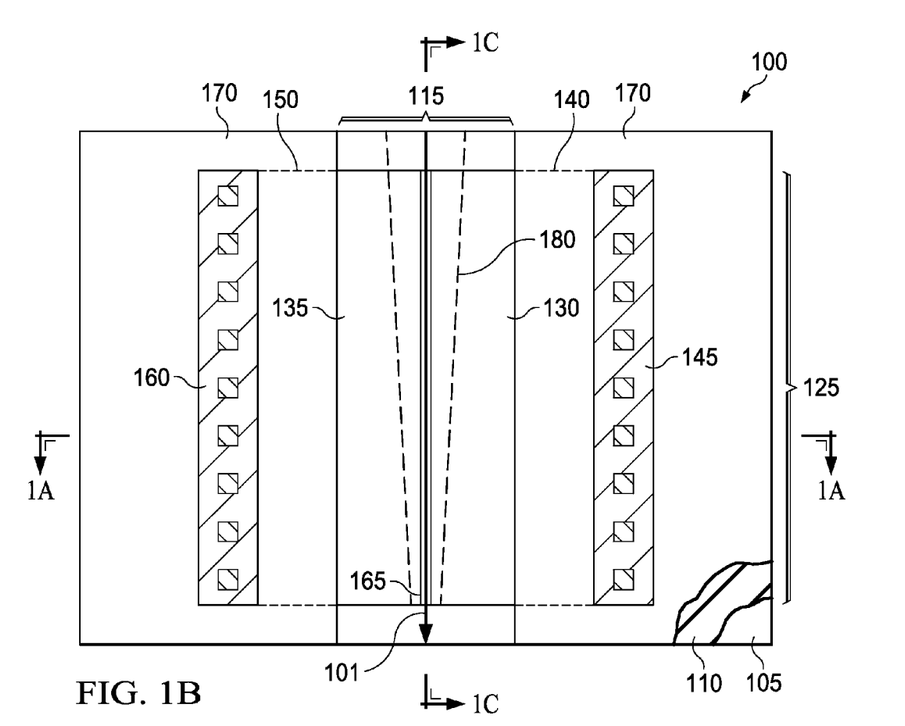
Figure 1C:
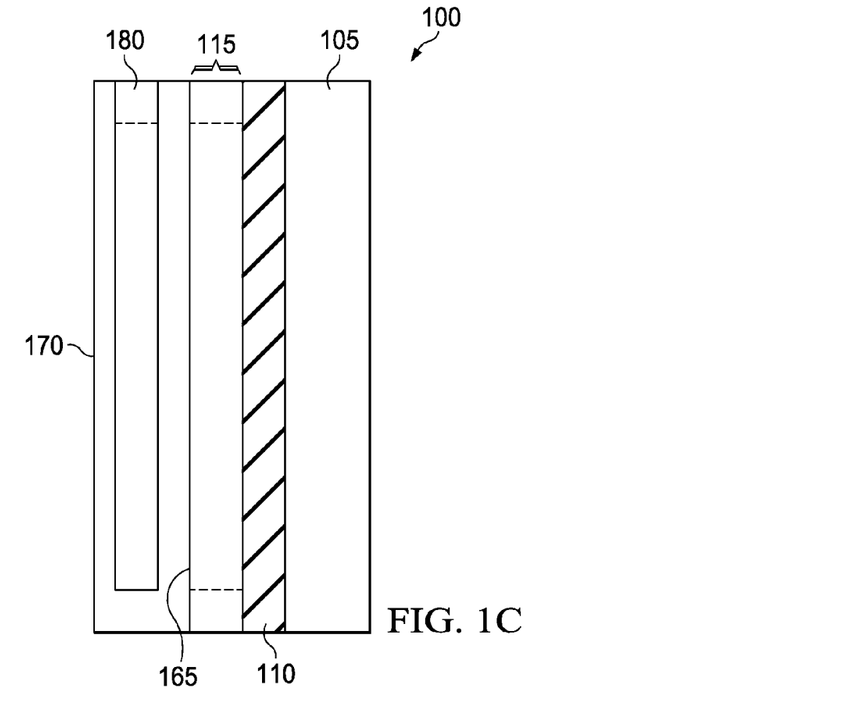

Turning to FIGS. 1A-1C, illustrated are views of an example of an all-optical phase shifter 100. FIG. 1B illustrates a plan view of the phase shifter 100, while FIGS. 1A and 1C respectively illustrate sections transverse and parallel to a propagation direction 101 of an optical signal propagating within the phase shifter 100.

The phase shifter 100 includes a substrate 105 and a dielectric layer 110 formed over a planar surface of the substrate 105. The substrate 105 may be any conventional or novel substrate material for micro-electronics or integrated optical devices. In some embodiments the substrate 105 is a portion of a semiconductor wafer of a type, e.g. silicon, that may be processed within standard semiconductor process tools. In other embodiments the substrate 105 may be or include Ge, GaAs, glass, quartz or sapphire. The dielectric layer 110 may be any conventional or novel dielectric material for microelectronics and/or integrated optical devices, e.g. thermal or plasma-deposited silicon oxide, and is not limited to any particular thickness. However, in various embodiments the thickness of the dielectric layer 110 is sufficient to optically isolate components formed over the dielectric layer 110 from the substrate 105.

The phase shifter 100 further includes a semiconductor waveguide 115 located over the dielectric layer 110. The semiconductor waveguide 115 may be formed from any conventional or novel semiconductor material. Without limitation, examples include Si, Ge, GaAs, InP, and InGaAs. An optical signal with the wavelength $\lambda_1$ within the semiconductor waveguide 115 has a direction of propagation that is typically aligned with the propagation direction 101. The optical signal is not limited to any particular wavelength but may be constrained by the material and/or geometry of the semiconductor waveguide 115. In some embodiments $\lambda_1$ may be any wavelength understood by those skilled in the art to have utility in optical communications, e.g., a wavelength in the C or L telecommunications bands. By way of example, optical communications wavelengths may be in a range of about 1250 nm to about 1680 nm. A wavelength in this range may be referred to as "long wavelength".

The semiconductor waveguide 115 includes a phase shifter segment 125. As described in further detail below, the phase shifter segment 125 may include doped regions 130, 135 that when present form one or more semiconductor junctions. A waveguide shoulder 140 conductively couples the doped region 130 to a contact region 145. A waveguide shoulder 150 conductively couples the doped region 135 to a contact region 160. An optional intrinsic region 165, discussed further below, separates the doped regions 130, 135.

A cladding region 170 is located over the semiconductor waveguide 115. The cladding region 170 may be any novel or conventional material have a refractive index less than that of the semiconductor waveguide 115. While not limited to any particular material, a convenient choice may be silicon oxide or silicon nitride. Contacts 175, which may be conventional, provide a conductive path from an upper surface of the cladding region 170 to the contact regions 145, 160. A quasi-DC voltage source 180 may bias the phase shifter segment 125, as discussed further below. Herein a quasi-DC voltage source produces a voltage that changes slowly with time, e.g. less than about 10 Hz.

A control signal waveguide 185 is located within the cladding region 170 proximate the semiconductor waveguide 115 and typically substantially collinear to the semiconductor waveguide 115 adjacent the phase shifter segment thereof. Herein and in the claims, "proximate" means near enough that an optical signal propagating within the control signal waveguide 185 may couple to the semiconductor waveguide 115, e.g., a propagating mode of the control signal waveguide 185 may be large enough to significantly or substantially overlap with the semiconductor waveguide 115. The distance between the control signal waveguide 185 and the semiconductor waveguide 115 may be about 50-100 nm in various embodiments. The control signal waveguide 185 may convey a control light signal to the phase shifter segment 125. The phase shifter segment 125 has an initial carrier concentration in the absence of illumination by the control light signal.

Evanescent light from the control light signal couples to the semiconductor waveguide 115 within the phase shifter segment 125, thereby photo-exciting electron-hole pairs in the phase shifter segment 125 of the semiconductor waveguide 115. These carriers locally increase the carrier density within the phase shifter segment 125. By principles understood by those skilled in the optical arts, the higher carrier density causes the refractive index of the semiconductor waveguide 115 within the phase shifter segment 125 to increase. The greater carrier density thereby increases the optical path length of the phase shifter segment 125. This increase of path length may cause the optical signal propagating within the semiconductor waveguide 115 to emerge from the phase shifter segment 125 with a different phase than would be the case when the phase shifter segment 125 has the initial (unilluminated) carrier density. Thus, the phase shifter segment 125 shifts the phase of the optical signal all-optically via the control signal waveguide 185. In other words, optical stimulation, e.g. photo-excitation, rather than electrical stimulation produces the greater concentration of carriers to cause the increase of refractive index.

In an embodiment the control light signal has a wavelength $\lambda_2$ with an equivalent energy $$E_2 = \frac{hc}{\lambda_2}$$

that exceeds a bandgap energy of the semiconductor material used for the semiconductor waveguide 115. Such a wavelength may be referred to herein as a "short wavelength". For example, silicon has a band gap of about 1.11 eV, equivalent to light with a wavelength of about 1.12 μm. When $\lambda_2$ is shorter than about 1.12 μm, a photon absorbed by the silicon may cause inter-band excitations of charge carriers in the silicon, e.g. may photo-excite an electron to the conduction band. The carrier density of the semiconductor waveguide 115 thereby increases. In one embodiment, $\lambda_2$ is, e.g., about 850 nm. Light having this wavelength may be generated using a vertical-cavity surface-emitting laser (VCSEL). While the various embodiments are not limited to any particular wavelength, it may be beneficial to select $\lambda_2$ such that $E_2$ is less than the bandgap energy of the material used to form the control signal waveguide 185. For example SiN may have a bandgap of about 5 eV.

The power of the control light may be any level sufficient to effect a phase change in the semiconductor waveguide 115. The power required to effect a particular phase change, e.g. π radians, may depend on various aspects of the phase shifter 100, such as the dimensions of the various elements thereof, dopant concentrations and the coupling coefficient of the semiconductor waveguide 115. In various embodiments a few dBm (e.g. 2-3 dBm) is expected to be sufficient to generate sufficient carrier density to effect a relative phase shift of π over the length of the phase shifter segment 125 of the semiconductor waveguide 115.

The charge carrier density is expected to return to the initial concentration when the illumination ends. The speed at which the carrier concentration falls may depend on the semiconductor used for the semiconductor waveguide 115 and the configuration of the phase shifter segment 125.

For example, in some embodiments the phase shifter segment 125 may be an unmodified portion of the waveguide 115. Thus the phase shifter segment 125 may have the same doping characteristics as the waveguide 115, e.g. may be undoped (intrinsic).

In some embodiments the phase shifter segment 125 may include complementary doped portions, such as the doped regions 130, 135, that form a PN junction. In yet other embodiments the phase shifter region may include the intrinsic portion 165 as illustrated in FIG. 1B. In such embodiments the doped regions 130, 135 form a PIN diode with the intrinsic portion 165.

While embodiments are not limited to the presence of the doped regions 130, 135, or to the presence of the intrinsic region 165, it is believed that the presence of one or both of these features may improve the performance of the phase shifter 100. For example it is believed that when the phase shifter segment 125 is an intrinsic semiconductor excess carriers produced by the control light signal will dissipate relatively slowly, thereby limiting the rate of operation of the phase shifter 100 to a frequency in a range of ~100 HZ to a few kHz. When the phase shifter segment 125 includes the doped regions 130, 135 the junction formed therebetween is expected to sweep the photoinduced carriers from the phase shifter segment 125 more quickly, thereby increasing the switching speed to at least about 1 MHz. The switching speed is expected to increase further when the junction is reverse-biased, e.g. by the voltage source 180. The presence of a reverse-biased PIN diode, e.g. when the intrinsic region 165 is present, is expected to further increase the speed of operation of the phase shifter 100 to at least about 1 GHz, with operation being possible at speeds in excess of 20 GHz.

Figure 2A:
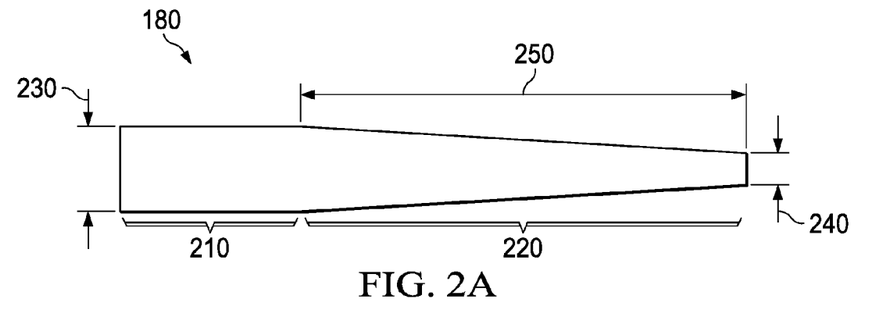
FIGS. 2A and 2B respectively illustrate top and side views of a tapered portion of a control signal waveguide of FIGS. 1A and 1C that may convey an optical control signal to the all-optical phase shifter.
Figure 2B:
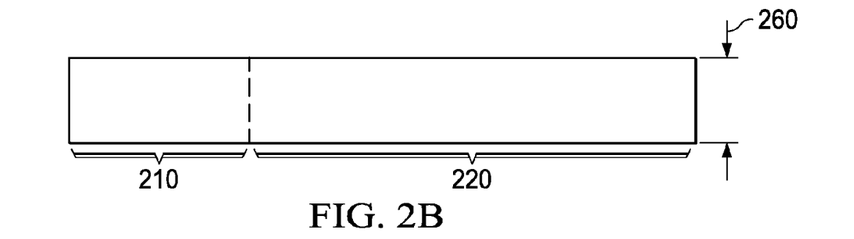

FIGS. 2A and 2B illustrate the control signal waveguide 185 in isolation to highlight various aspects thereof. FIG. 2A provides a plan view, and FIG. 2B provides a side view. The control signal waveguide 185 includes a guiding portion 210 and a tapered portion 220. Within the guiding portion 210 a width 230 is uniform within the tolerances of the manufacturing technology used. Thus, it is expected that the control light signal within the guiding portion 210 will propagate with relatively little loss. The width 230 is not limited to any particular value, but in some embodiments may be narrower than the semiconductor waveguide 115 when the wavelength $\lambda_2$ is less than the wavelength $\lambda_1$. In some cases it may be desirable to limit the width 230 to a value below which light from the optical signal within the semiconductor waveguide 115 does not couple significantly to the control signal waveguide 185. In various embodiments the width 230 is in a range of about 100 nm to about 300 nm when $\lambda_1$ is about 1550 nm. In one embodiment the width 230 is about 300 nm, such as when $\lambda_2$ is about 850 nm.

Within the tapered portion 220 the control signal waveguide 185 decreases in width from the width 230 to a width 240. It is typically desirable that the width 240 be as small as possible for the process technology used, e.g. to minimize reflections that couple control light back into the control signal waveguide 185. In some cases it may be preferable that the width 240 is less than about 100 nm, with less than about 75 nm being more preferred and less than about 50 nm being more preferred.

A length 250 of the tapered portion 220 is not limited to any particular value. However, it may be desirable to provide a minimum needed overlap length of the tapered portion 220 and the semiconductor waveguide 115. A minimum needed value of the length 250 may be determined from the absorption coefficient of the semiconductor waveguide and $\lambda_2$. For example, silicon has an absorption coefficient of about 383 cm$^{-1}$ at 850 nm. Thus, $\lambda_2$ is about 850 nm, and the minimum length 250 may be about 50 μm to provide adequate coupling of the optical control signal to the semiconductor waveguide 115. In various embodiments the length 250 may be within a range of about 50 μm to about 500 μm, depending on the wavelength.

The control signal waveguide 185, and therefore the tapered portion 220, has a thickness 260 that is not limited to any particular value. A thickness may be determined by one skilled in the art taking into account, e.g. the complex RI of the material used and $\lambda_2$. In various embodiments the thickness 260 is in a range of about 100 nm to about 200 nm, such that the control signal waveguide 185 is formed from silicon nitride.

FIGS. 3A-3L illustrate the phase shifter 100 at various stages of manufacturing in an example process sequence 300. In the following description of the process sequence 300, the various processes that are described may be conventional or novel unless otherwise noted.

Figure 3A:
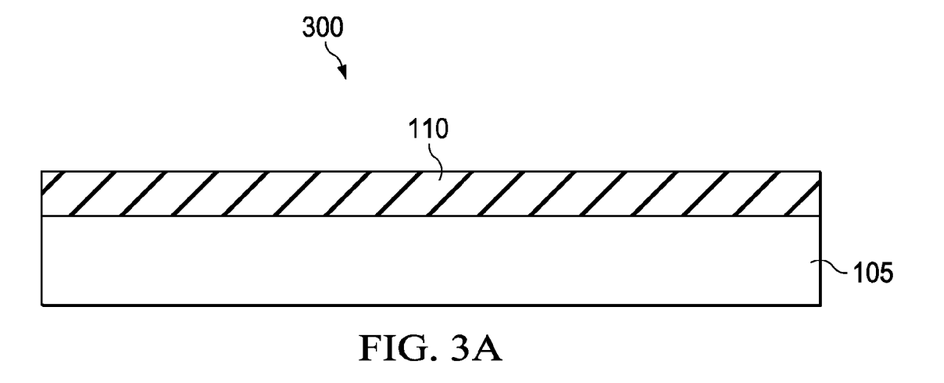
FIGS. 3A-3L illustrates an optical device, e.g. the all-optical phase shifter of FIGS. 1A-1C, at various stages of formation.

Initially, in FIG. 3A the substrate 105 is provided with the dielectric layer 110 located thereover. Herein and in the claims, in this context "provided" means that the substrate 105 may be manufactured by the individual or business entity performing the disclosed methods, or obtained thereby from a source other than the individual or entity, including another individual or business entity. The dielectric layer 110 may also be conventionally formed on the substrate 105 as previously described.

Figure 3B:
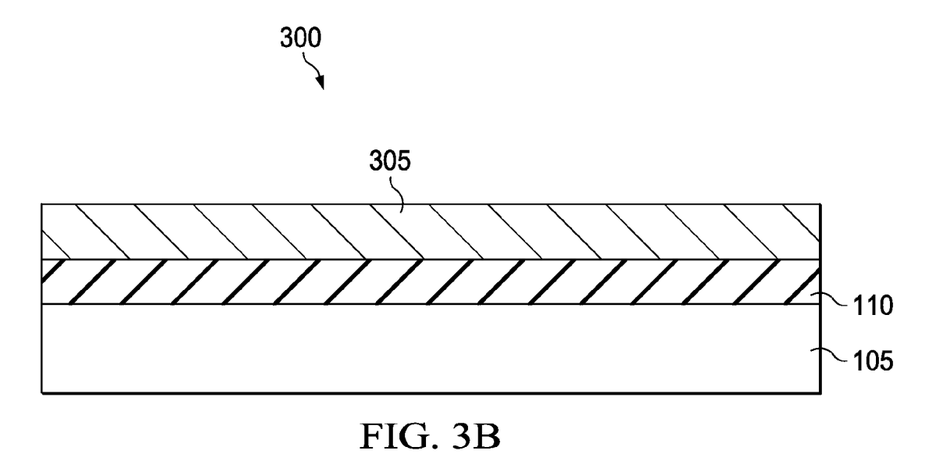

In FIG. 3B, a semiconductor layer 305 may be formed over the dielectric layer 110. The semiconductor layer may me formed of any of the materials described with respect to the semiconductor waveguide 115. In a nonlimiting embodiment, the semiconductor layer 305 is a layer of undoped polysilicon with a thickness of about 200 nm.

Figure 3C:
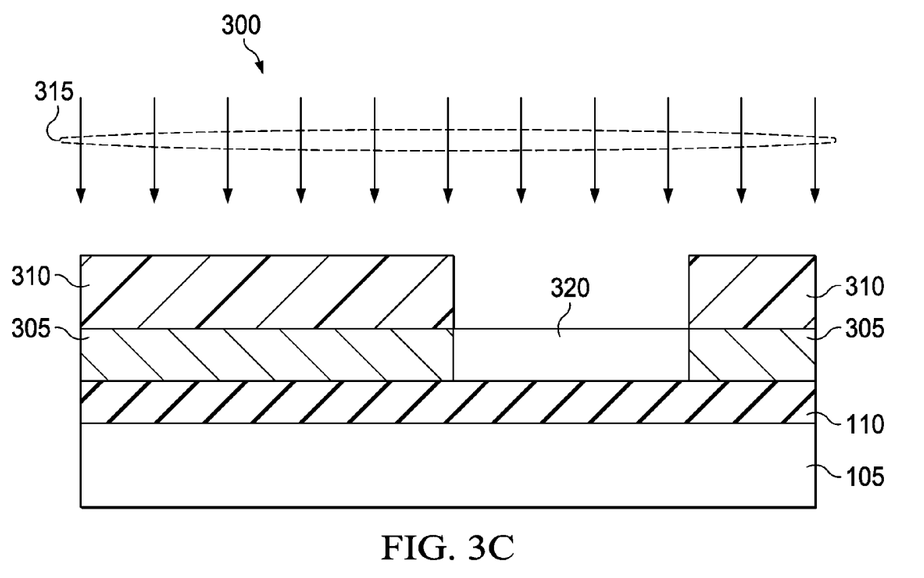

In FIG. 3C a patterned photoresist layer 310 has been formed. An implant process 315 implants a dopant of a first polarity, e.g. an n-type dopant such as phosphorous, to form an n-doped region 320. The concentration of the n-type dopant is not limited to any particular value, but in an example embodiment may be in a range of about 1E16-1E18 cm$^{-3}$. In some embodiments an n-type dopant concentration of about 1E17 is preferred.

Figure 3D:
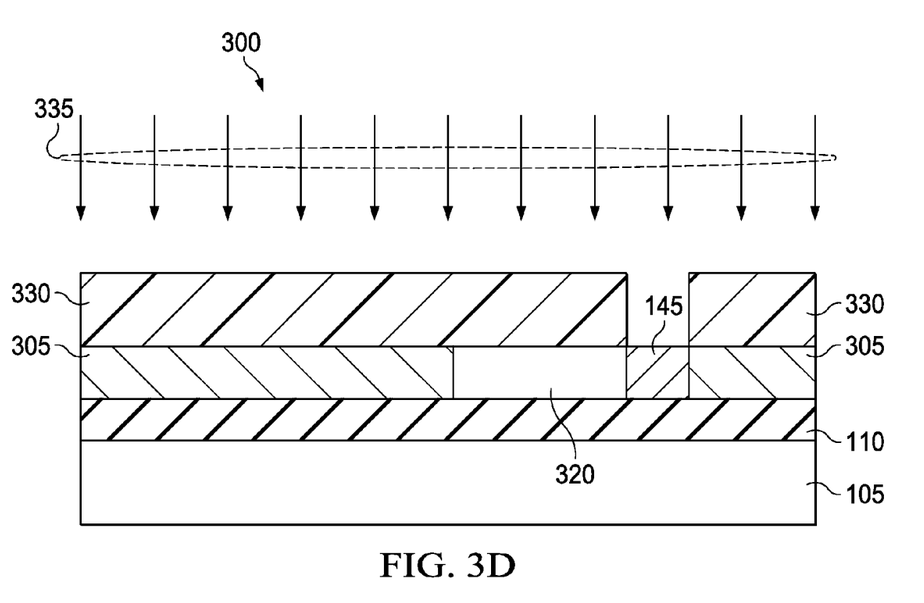

In FIG. 3D, a photoresist layer 330 has been patterned to create an opening over the region 320. An implant process 335 implants a dopant of the first polarity, which may be the same dopant as used in the implant process 315. The dopant may be implanted with a concentration sufficient to form an n$^{++}$ region within the semiconductor layer 305, e.g. about 1E20 cm$^{-3}$. The implant results in the contact region 145.

Figure 3E:
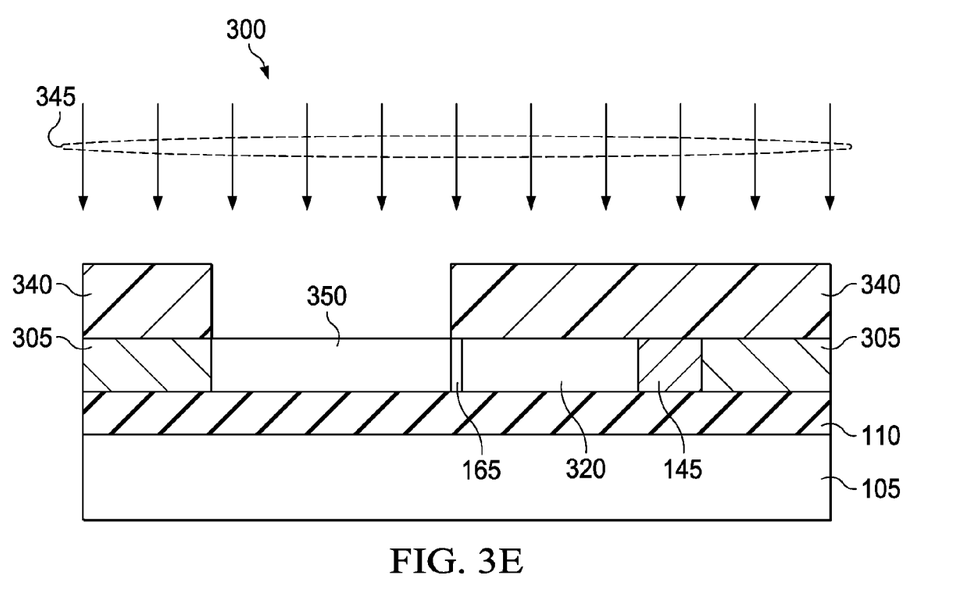

In FIG. 3E a patterned photoresist layer 340 has been formed. An implant process 345 implants a dopant of a second polarity, e.g. a p-type dopant such as boron, to form a p-doped region 350. The concentration of the p-type dopant is not limited to any particular value, but in an example embodiment may be in a range of about 1E16-1E18 cm$^{-3}$. In some embodiments a p-type dopant concentration of about 1E17 is preferred.

In the illustrated embodiment the patterned layers 310, 340 are formed such that the photoresist layers 310, 340 both cover a central region of the semiconductor layer 305. This region is protected from both the implant processes 315, 345 and thus may be intrinsic. This central region corresponds to the intrinsic region 165, and is referred to hereinafter as such.

Figure 3F:
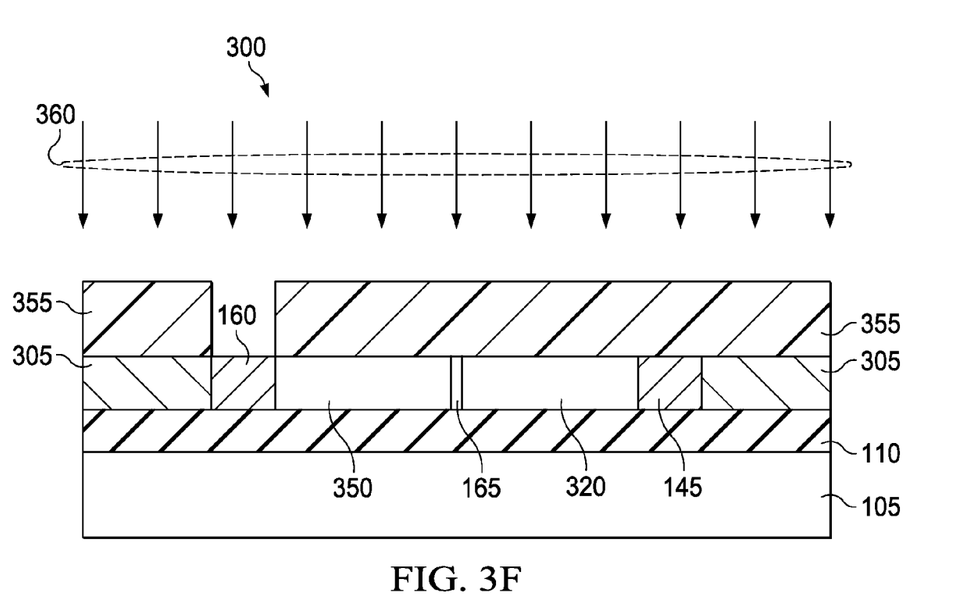

In FIG. 3F, a photoresist layer 355 has been patterned to form an opening over the region 350. An implant process 360 implants a dopant of the second polarity, which may be the same dopant as used in the implant process 345. The dopant may be implanted with a concentration sufficient to form a p$^{++}$ region within the semiconductor layer 305, e.g. about 1E20 cm$^{-3}$. The implant results in the contact region 160.

Figure 3G:
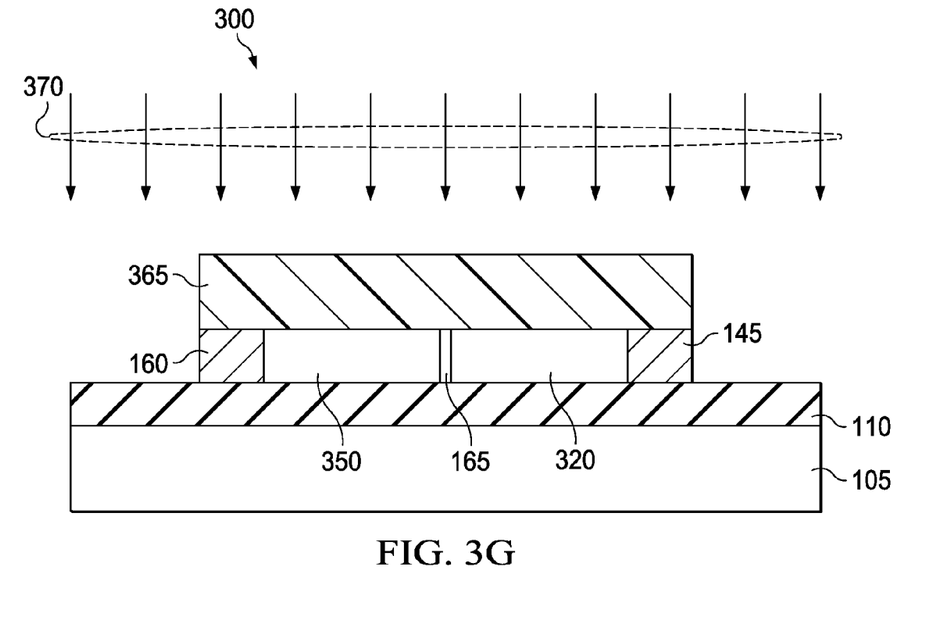

In FIG. 3G a patterned photoresist layer 365 has been formed that covers the several doped regions. An etch process 370 removes portions of the semiconductor layer 305 that are not protected by the photoresist layer 365. The etch process exposes the dielectric layer 110 in the unprotected areas.

Figure 3H:
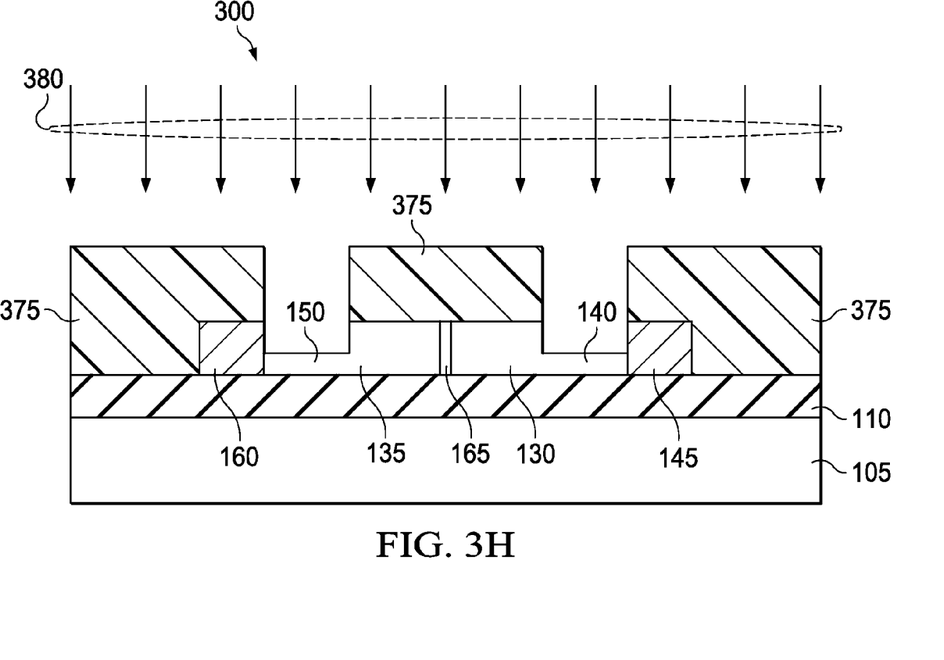

In FIG. 3H a patterned photoresist layer 375 has been formed. Portions of the regions 320, 350 are exposed by openings in the photoresist layer 375. An etch process 380 removes a portion of the exposed regions 320, 350, thereby forming the doped regions 130, 135 and the shoulders 140, 150.

Figure 3I:
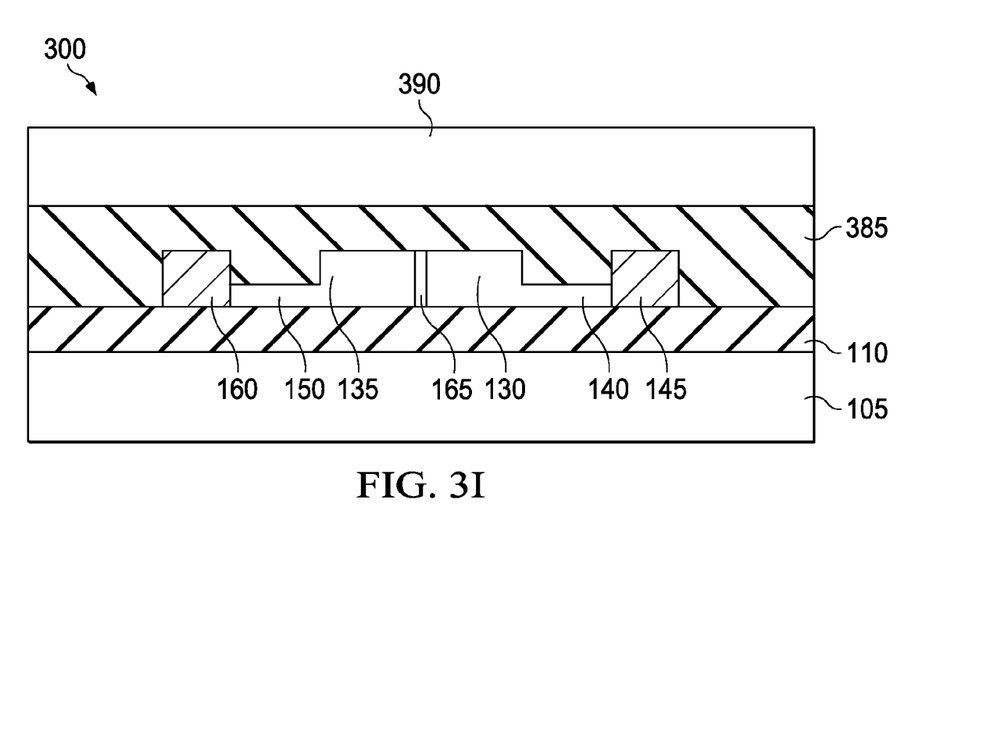

In FIG. 3I a first dielectric layer 385, e.g. silicon oxide, has been formed over the doped regions 130, 135 and planarized. A second dielectric layer 390, e.g. silicon nitride, having an RI greater than that of the first dielectric layer 385, has been formed over the first dielectric layer 385.

Figure 3J:
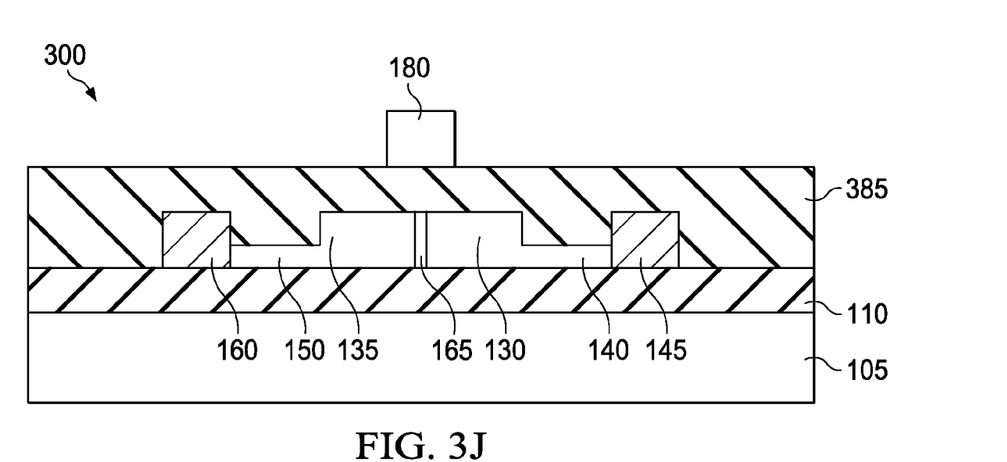

In FIG. 3J the second dielectric layer 390 has been patterned, e.g. by photoresist pattern and etch, to form the control signal waveguide 185.

Figure 3K:
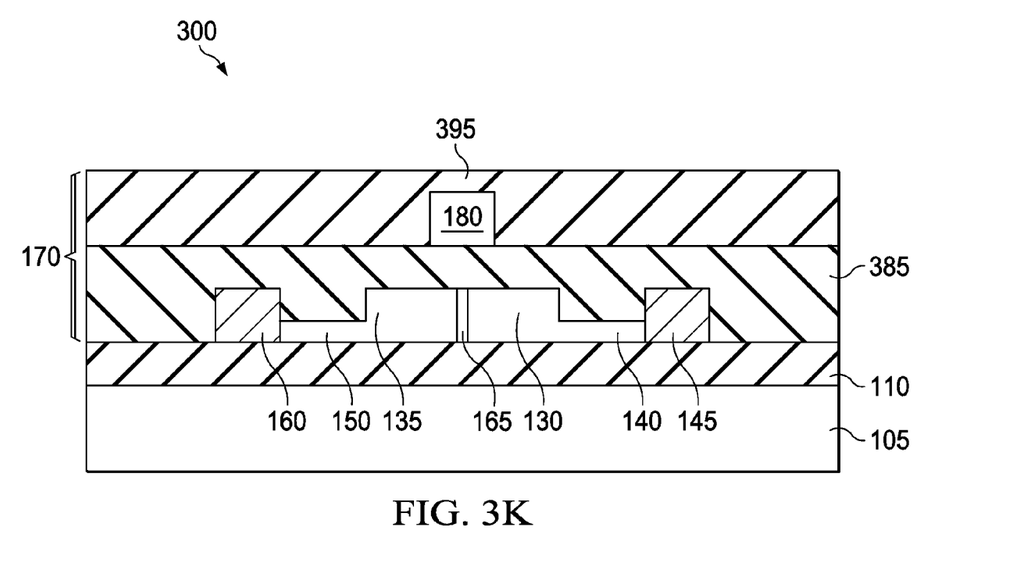

In FIG. 3K a third dielectric layer 395, e.g. silicon oxide, having an RI less than that of the control signal waveguide 185 has been formed thereover. An optional planarization of the third dielectric layer 395 has been performed as well. The first and third dielectric layers 385, 395 form the cladding region 170 illustrated in FIG. 1B.

Figure 3L:
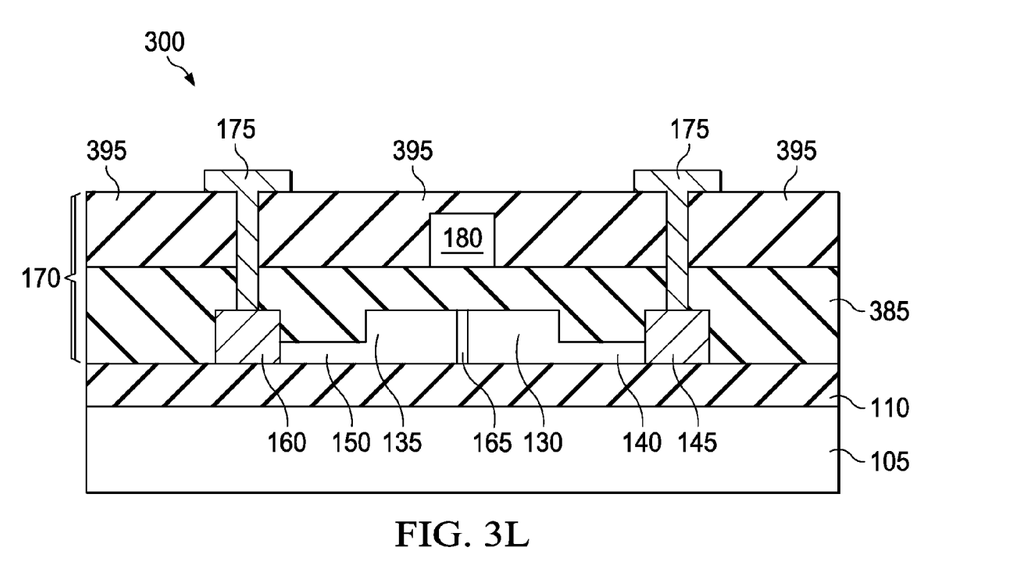

In FIG. 3L, the contacts 175 have been formed to provide a conductive path to the contact regions 145, 160.

Figure 4:
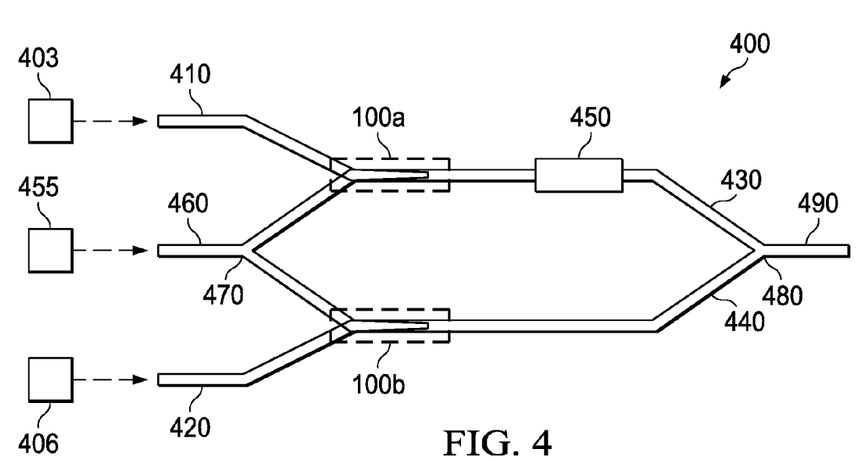
FIG. 4 illustrates an embodiment in which a Mach-Zehnder device including two all-optical phase shifters is configured to operate to provide an XOR logic function.

Turning to FIG. 4, illustrated is a first example embodiment of an optical device 400 that employs the phase shifter 100. The device 400 may be employed, e.g. to optically perform an XOR logic function on data provided by first and second optical sources 403, 406 to respective inputs 410, 420. The optical sources 403, 406 provide light at a short wavelength, e.g. about 850 nm. The optical sources 403, 406 may be intensity modulated with digital data, e.g. a serial stream of data bits.

Waveguide arms 430, 440 are arranged in a Mach-Zehnder configuration. An optical source 455 provides a long-wavelength (e.g. about 1550 nm) continuous-wave (CW) optical signal to an input 460 of the Mach-Zehnder. The CW signal is split at a 1×2 junction 470 between the waveguide arms 430, 440. The waveguide arm 430 includes an optional conventional phase shifter 450, e.g. a heater, to tune the optical path length of the adjacent segment of the waveguide arm 430 relative to the optical path length of the waveguide arm 440.

Each of the waveguide arms 430, 440 includes an instance of the phase shifter 100, respectively denoted 100a, 100b. The first optical input 410 receives a short wavelength, e.g. 850 nm, optical control signal bearing first digital data to the phase shifter 100a. The second optical input 420 provides a short wavelength optical control signal bearing second digital data to the phase shifter 100b. The phase shifters 100a, 100b may be configured to provide a phase shift of 0 radians when the intensity of the light provided by the optical inputs 410, 420 is a control value corresponding to a Boolean FALSE (0), and π radians when the intensity of the light provided by the optical inputs 410, 420 is a control value corresponding to a Boolean TRUE (1).

When data bits received by the optical inputs 410, 420 each have a same intensity state, e.g. 0,0 or 1,1, the light propagating in each waveguide arm 430, 440 may be either unshifted (0,0) or equally shifted (1,1). The light then adds constructively at a 2×1 junction 480 to produce an output bit at an output 490 having the same phase state. When the data bits received by the optical inputs 410, 420 have opposite intensity states, e.g. 0,1 or 1,0, then the phase of the light propagating in one of the waveguide arms 430, 440 may be shifted π radians relative to the other of the waveguide arms 430, 440. In this case the light from the waveguide arms 430, 440 will destructively interfere and the output 490 of the optical device 400 will correspond to a Boolean FALSE.

The truth table below summarizes the output of the optical device 400 for each of four input states of the optical inputs 410, 420. The optical device 400 is seen to provide an XOR function with respect to the input signals received by the optical inputs 410, 420.

| D1 | D2 | Out |
|----|----|-----|
| 0  | 0  | 1   |
| 0  | 1  | 0   |
| 1  | 0  | 0   |
| 1  | 1  | 1   |

In another embodiment the 2×1 junction 480 is replaced with a 2×2 3 dB coupler. This embodiment may be used, e.g. for optical switching and routing of data signals.

Figure 5:
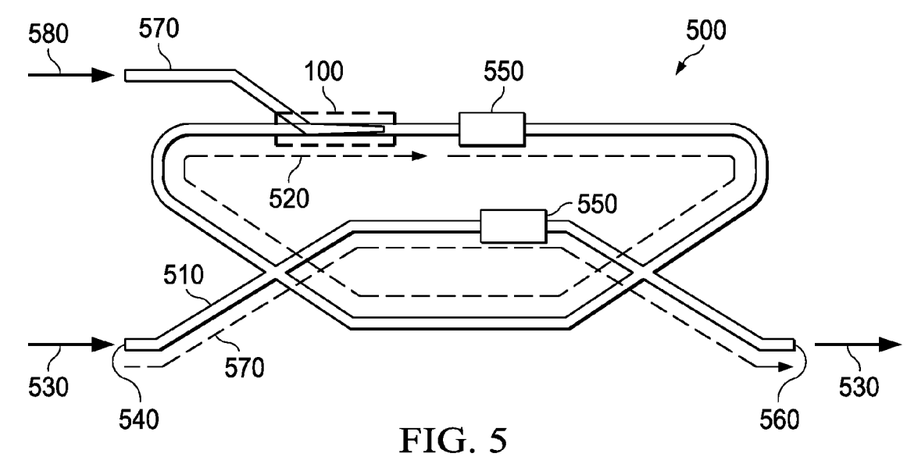
FIG. 5 illustrates an embodiment in which an all-optical phase shifter is configured to tune a resonance frequency of a ring resonator.

FIG. 5 illustrates an embodiment of an optical device 500 that includes an optical path 510 and a ring resonator 520. The device 500 may be used, e.g. as a controllable optical attenuator. The optical path 510 is configured to receive a long-wavelength, e.g. 1550 nm, optical signal 530 at an input 540. The optical path 510 crosses the ring resonator 520 at two junctions that couple light therebetween. Each of the optical path 510 and the ring resonator 520 may include an optional conventional phase shifter, e.g. heaters 550, to tune the optical path lengths thereof.

The optical path (waveguide) of the ring resonator 520 has a complex RI, and thus has a non-zero propagation loss. Therefore the frequency response of the ring resonator 520 includes a notch at a resonance wavelength $\lambda_R$. When $\lambda_R$ is about equal to the wavelength of the optical signal 530, the optical signal 530 may be significantly attenuated at an output 560, e.g. by at least about 40 dB. When $\lambda_R$ differs sufficiently from the optical signal 530 wavelength, the optical signal 530 may be essentially unattenuated, e.g. attenuated by no more than about 1 dB.

A control signal waveguide 570 provides a short wavelength, e.g. 850 nm, optical control signal 580 to an instance of the phase shifter 100. The phase shifter 100 may be configured to change the optical path length of the ring resonator 520, thereby changing $\lambda_R$. The phase shifter 100 may thereby tune the device 500 to controllably attenuate the optical signal 530. Because the phase shifter 100 may operate at high speed, e.g. greater than about 20 GHz, the device 500 may modulate the intensity of the optical signal 530 at a similar rate.

Figure 6:
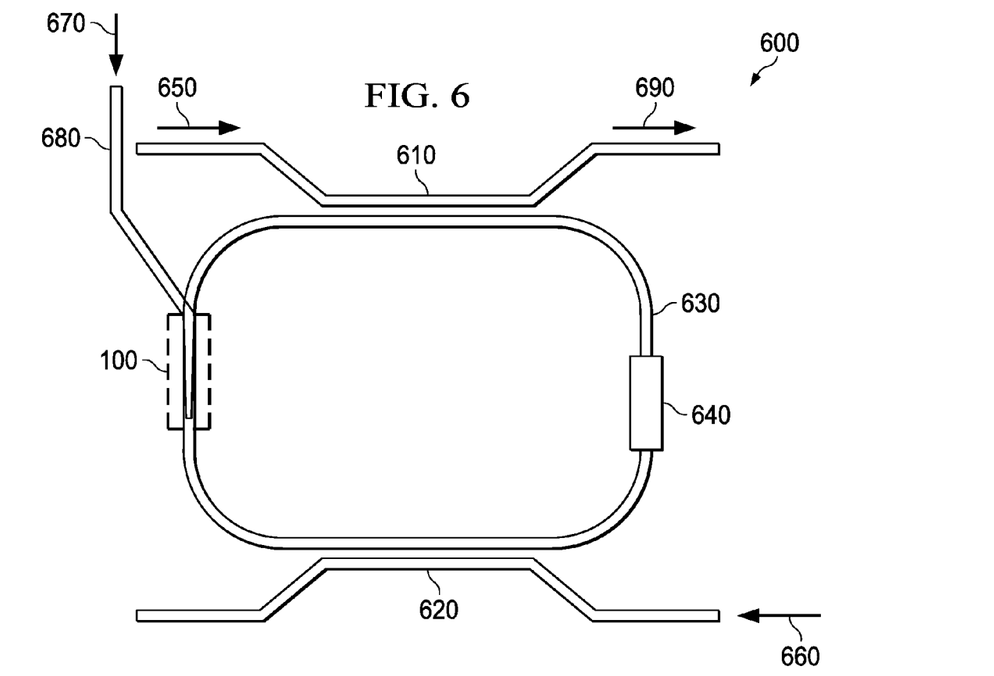
FIG. 6 illustrates an embodiment in which an all-optical phase shifter is configured to tune a drop channel wavelength of an add/drop ring resonator filter.

In a third example embodiment, FIG. 6 illustrates an all-optical add-drop filter 600 that includes an instance of the phase shifter 100. The filter 600 includes first and second optical paths 610, 620 and a ring resonator 630. The ring resonator 630 may optionally include a conventional phase shifter 640, e.g. a heater, to adjust the optical path length of the ring resonator 630. A long wavelength, e.g. 1550 nm, optical data signal 650 enters the first optical path 610 and couples to the ring resonator 630. The data signal may be, e.g. a wavelength-division multiplexed (WDM) signal. A long wavelength CW optical signal 660 enters the second optical path 620 and couples to the ring resonator 630. A short wavelength, e.g. 850 nm, optical control signal 670 couples to the phase shifter 100 via a control signal waveguide 680. In response to the optical control signal 670 the phase shifter 100 changes the optical path length of the ring resonator 630, thereby changing the resonant frequency thereof. A notch in the frequency pass band of the filter 600 thereby changes, changing a channel of the WDM signal that is removed by the filter 600 in an output signal 690.

Figure 7:
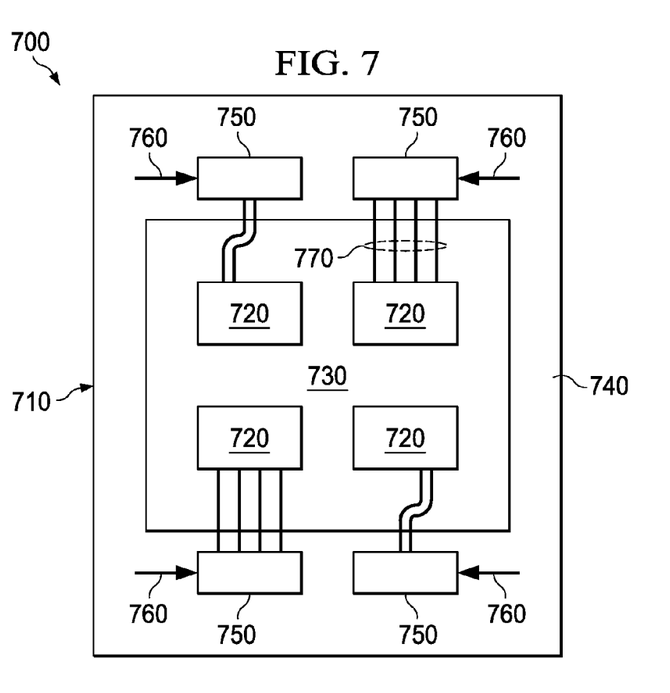
FIG. 7 illustrates an optical system that includes an optical device having an all-optical phase shifter such as that illustrated by FIGS. 1A-1C.

FIG. 7. Illustrates an optical system 700 that includes a substrate 710 having one or more optical devices 720 formed thereon. The optical devices 720 may each include an instance of the phase shifter 100. The optical devices 720 are located in an all-optical region 730 of the substrate 710. An electrical control region 740 of the substrate 710 includes driver modules 750. The driver modules 750 may receive electrical, e.g. RF, signals 760 encoded with data to be optically processed by the optical devices 720. Herein and in the claims an RF signal is an electrical signal having frequency components at 1 kHz or greater with a power of at least about 1 dBm. The driver modules 750 provide optical signals 770 via optical interconnects, e.g. waveguides, to the optical devices 720.

For the purposes of the discussion and the claims a region of an optical system is all-optical when the region surrounds one or more optical devices configured to be controlled by corresponding optical control signals propagated by waveguides or similar structures. The all-optical region may include quasi-DC electrical control signals, but does not include electrical signals that convey high-speed data to the optical devices.

The all-optical region 730 does not include high speed, e.g. RF, electrical signals, but may in some embodiments include quasi-DC electrical signals to control heater-type phase shifters within the optical devices 720. Because the all-optical region 730 does not include high-speed electric signals, little or no cross-talk is expected to occur between various control signals within the all-optical region 730. Thus, isolation of signals propagating within the all-optical region 730 is improved relative to optical devices that receive high-speed electrical signals. Such isolation is expected to improve various system-level operating parameters, such as the signal-to-noise ratio of data channels processed by the system 700 relative to similar systems that operate using high-speed electrical control signals.

In the embodiment of FIG. 7, the electrical control region 740 is illustrated without limitation as being located around the periphery of the optical system 700. In other embodiments, the all-optical region 730 may be located, e.g. on opposite sides of the system substrate.

Figure 8:
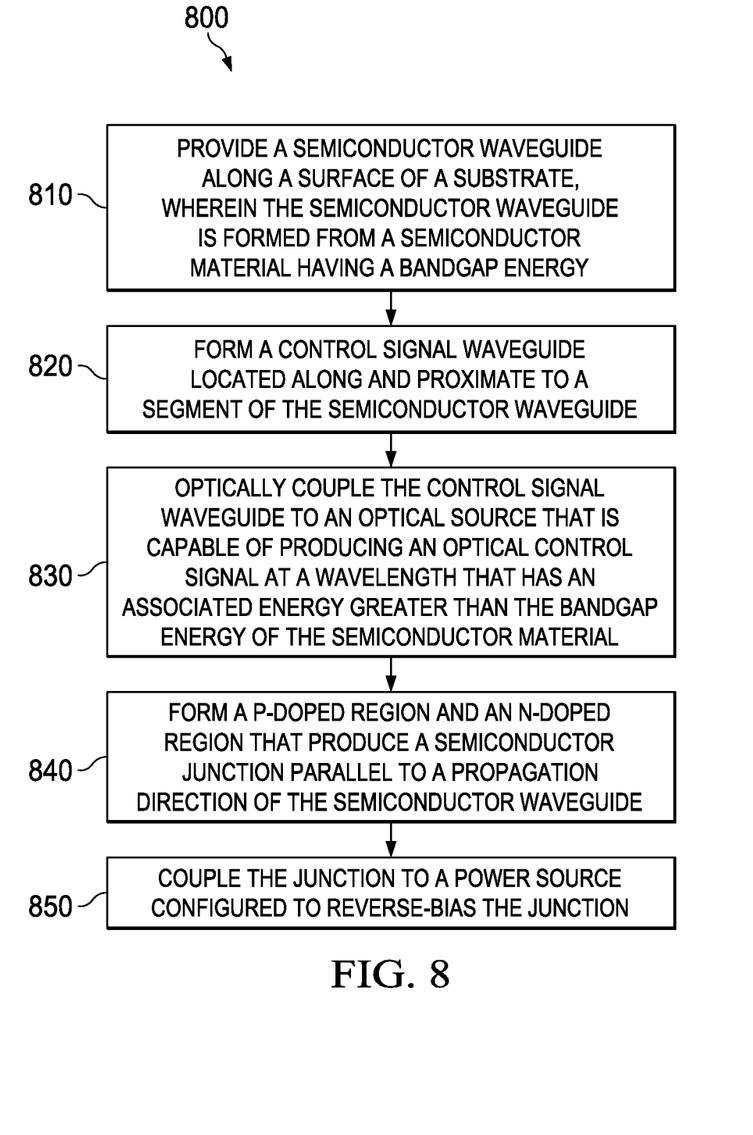
FIG. 8 presents a method of forming an optical device of any of FIGS. 1A-1C, 2A-2B, 4, 5, 6, and/or 7.

Turning now to FIG. 8, a method 800 of forming a device is described. The following description may refer to any of the aforementioned elements of the phase shifter 100 without limitation thereto. Furthermore the steps of the method 800 may be performed in an order other than the illustrated order.

A step 810 provides a semiconductor waveguide, e.g. the semiconductor waveguide 115, along a surface of a substrate, e.g. the substrate 105. The semiconductor waveguide is formed from a semiconductor material having a bandgap energy. Herein and in the claims, in this context "provides" means that the semiconductor waveguide may be manufactured by the individual or business entity performing the method 800, or obtained thereby from a source other than that individual or entity, including another individual or business entity.

In a step 820, a control signal waveguide, e.g. the control signal waveguide 180, is formed that is located along and proximate to a segment of the semiconductor waveguide, e.g. within the phase shifter segment 125.

In a step 830, the control signal waveguide is optically coupled to an optical source, e.g. the optical source 403, that is capable of producing an optical control signal at a wavelength that has an associated energy greater than the bandgap energy of the semiconductor material.

The following provides various optional features of the method 800. In some cases these optional features may be combined.

In a step 840 a p-doped region and an n-doped region may be formed that form a semiconductor junction parallel to a propagation direction of the semiconductor waveguide. The semiconductor waveguide may optionally include an intrinsic region located between the n-doped region and the p-doped region. In a step 850 the semiconductor junction may be coupled to a power source configured to reverse-bias the junction.

The semiconductor waveguide may comprise silicon. The control signal waveguide may comprise silicon nitride. The optical source may be a vertical-cavity surface-emitting laser.

Those skilled in the art to which this application relates will appreciate that other and further additions, deletions, substitutions and modifications may be made to the described embodiments.

What is claimed is:

1. A device, comprising:
   a substrate having a planar surface;
   a semiconductor waveguide located along said planar surface; and
   a control signal waveguide having a segment located along and proximate a segment of said semiconductor waveguide; and
   wherein the control signal waveguide is configured to photo-excite charge carriers in said semiconductor waveguide.

2. The device of claim 1, wherein said semiconductor waveguide comprises silicon.

3. The device of claim 1, wherein said semiconductor waveguide includes an n-doped region and a p-doped region that form a semiconductor junction parallel to a propagation direction of said semiconductor waveguide.

4. The device of claim 3, wherein said semiconductor waveguide includes an intrinsic region located between said n-doped region and said p-doped region.

5. The device of claim 3, further comprising a power source connected to reverse-bias said semiconductor junction.

6. The device of claim 1, wherein said control signal waveguide comprises silicon nitride.

7. The device of claim 1, further comprising a vertical-cavity surface-emitting laser connected to inject light into said control signal waveguide, wherein the injected light has a short enough wavelength to cause inter-band excitations of charge carriers in the semiconductor waveguide.

8. The device of claim 1, wherein said semiconductor waveguide is configured to provide an optical XOR function.

9. The device of claim 1, wherein said semiconductor waveguide is a portion of a ring resonator.

10. A system, comprising:
    a substrate having a surface;
    a electrical control region along said surface of said substrate, the region including at least one electrical device being configured to produce an optical control signal; and
    a second region of said substrate that is laterally separated from the electrical control region and includes at least one all-Optical device being configured to receive said optical control signal,
    wherein said optical device includes:
      a semiconductor waveguide located along the surface of the substrate; and
      a control signal waveguide having a segment located along and proximate to a segment of said semiconductor waveguide; and wherein the control signal waveguide is configured to photo-excite charge carriers within said semiconductor waveguide.

11. The system of claim 10, further comprising and optical source configured to inject an RF-modulated laser signal into the control signal waveguide, the source having a wavelength less than about 1.1 µm.

12. The system of claim 10, wherein said optical device includes an optical path with an index of refraction controlled by said optical control signal.

13. The system of claim 12, wherein said optical path is a portion of a ring resonator or a Mach-Zehnder interferometer.

14. A method, comprising:
providing a semiconductor waveguide along a surface of a substrate, said semiconductor waveguide being formed from a semiconductor material having a bandgap energy;
forming a control signal waveguide located along and proximate to a segment of said semiconductor waveguide;
optically coupling said control signal waveguide to an optical source that is capable of producing an optical control signal at a wavelength that has an associated energy greater than the bandgap energy.

15. The method of claim 14, wherein said semiconductor waveguide comprises silicon.

16. The method of claim 14, further comprising forming a p-doped region and an n-doped region that forms a semiconductor junction parallel to a propagation direction of said semiconductor waveguide.

17. The method of claim 16 wherein said semiconductor waveguide includes an intrinsic region located between said n-doped region and said p-doped region.

18. The method of claim 16, further comprising coupling said semiconductor junction to a power source configured to reverse-bias said semiconductor junction.

19. The method of claim 14, wherein said control signal waveguide comprises silicon nitride.

20. The method of claim 14, wherein said optical source is a vertical-cavity surface-emitting laser.

* * * * *